(12) United States Patent
Shimohira

(10) Patent No.: US 11,828,988 B2
(45) Date of Patent: Nov. 28, 2023

(54) OPTICAL FIBER FIXING STRUCTURE, LASER TRANSMISSION CABLE USING OPTICAL FIBER FIXING STRUCTURE, AND LASER DEVICE

(71) Applicant: Fujikura Ltd., Tokyo (JP)

(72) Inventor: Koki Shimohira, Sakura (JP)

(73) Assignee: Fujikura Ltd., Tokyo (JP)

( * ) Notice: Subject to any disclaimer, the term of this patent is extended or adjusted under 35 U.S.C. 154(b) by 80 days.

(21) Appl. No.: 17/427,743

(22) PCT Filed: Feb. 18, 2020

(86) PCT No.: PCT/JP2020/006250
§ 371 (c)(1),
(2) Date: Aug. 2, 2021

(87) PCT Pub. No.: WO2020/171058
PCT Pub. Date: Aug. 27, 2020

(65) Prior Publication Data
US 2022/0107464 A1 Apr. 7, 2022

(30) Foreign Application Priority Data
Feb. 21, 2019 (JP) .................... 2019-029367

(51) Int. Cl.
*G02B 6/36* (2006.01)
(52) U.S. Cl.
CPC ......... *G02B 6/3652* (2013.01); *G02B 6/3624* (2013.01)
(58) Field of Classification Search
None
See application file for complete search history.

(56) References Cited

U.S. PATENT DOCUMENTS 4,421,383 A * 12/1983 Carlsen ............... G02B 6/32
385/72
4,826,272 A * 5/1989 Pimpinella ......... H01L 31/0203
257/E33.056

(Continued)

FOREIGN PATENT DOCUMENTS

CN 105659133 A 6/2016
CN 107092054 A 8/2017

(Continued)

OTHER PUBLICATIONS

International Search Report issued in International Application No. PCT/JP2020/006250, dated Mar. 31, 2020 (3 pages).

*Primary Examiner* — Jerry Rahll
(74) *Attorney, Agent, or Firm* — Osha Bergman Watanabe & Burton LLP

(57) ABSTRACT

An optical fiber fixing tool includes: a fiber accommodating body having a fiber accommodating groove that accommodates: at least a part of an uncovered bare portion of an optical fiber and a boundary part between the uncovered bare portion and a covered portion of the optical fiber, a cover being removed to expose a bare fiber in the uncovered bare portion; and a fixing resin that fills an inside of the fiber accommodating groove and fixes at least the part of the uncovered bare portion and the boundary part. In a cross-sectional view of the fiber accommodating groove viewed from a cross section of the optical fiber, the entire uncovered bare portion and the entire boundary part are accommodated in the fiber accommodating groove, and the fixing resin covers an entire outer circumference of the uncovered bare portion and an entire outer circumference of the boundary part.

9 Claims, 5 Drawing Sheets

(56) References Cited

U.S. PATENT DOCUMENTS

| | | | |
|---|---|---|---|
| 7,203,410 B2 | 4/2007 | Wei et al. | |
| 2003/0044126 A1* | 3/2003 | Kawano | G02B 6/2551 385/96 |
| 2003/0077345 A1* | 4/2003 | Suzuki | B29C 45/14549 425/116 |
| 2011/0091167 A1* | 4/2011 | Nishimura | G02B 6/4249 385/88 |
| 2012/0008648 A1 | 1/2012 | Gapontsev et al. | |
| 2013/0308910 A1* | 11/2013 | Nishimura | G02B 6/381 385/78 |
| 2014/0066756 A1* | 3/2014 | Sinclair | G02B 6/322 264/1.24 |
| 2016/0202430 A1* | 7/2016 | de Jong | G02B 3/0087 385/74 |
| 2016/0259140 A1 | 9/2016 | Blomster | |

FOREIGN PATENT DOCUMENTS

| | | |
|---|---|---|
| CN | 109073831 A | 12/2018 |
| CN | 109073832 A | 12/2018 |
| JP | H04-296803 A | 10/1992 |
| JP | H11-311722 A | 11/1999 |
| JP | 2003-004952 A | 1/2003 |
| JP | 2007-271786 A | 10/2007 |
| JP | 2013-257520 A | 12/2013 |
| JP | 2015-197638 A | 11/2015 |
| JP | 2016-533543 A | 10/2016 |
| JP | 2018-004770 A | 1/2018 |
| JP | 2018-045168 A | 3/2018 |

\* cited by examiner

OPTICAL FIBER FIXING STRUCTURE, LASER TRANSMISSION CABLE USING OPTICAL FIBER FIXING STRUCTURE, AND LASER DEVICE

CROSS-REFERENCE TO RELATED APPLICATIONS

This application claims priority from Japanese Patent Application No. 2019-029367 filed on Feb. 21, 2019, the contents of which are incorporated herein by reference in their entirety.

BACKGROUND

Technical Field

The present invention relates to an optical fiber fixing structure, a laser transmission cable using the optical fiber fixing structure, and a laser device.

Description of Related Art

Fiber laser devices are used in various fields such as laser processing fields and medical fields because the fiber laser devices have excellent light-collecting properties and high power density, and it is possible to obtain light having a small beam spot.

The fiber laser device has a laser transmission cable in which an optical fiber is disposed in order to transmit high-power laser light emitted from an oscillator. The fiber laser device allows the laser light to propagate in the optical fiber, and launched the laser light through a silica block connected to the exit end of the optical fiber. The silica block and the optical fiber connected to the silica block are generally fixed by a resin inside the housing. The structure of the exit end side of the laser light in such a fiber laser device is disclosed in, for example, Patent Document 1.

PATENT DOCUMENT

[Patent Document 1]
Japanese Unexamined Patent Application, First Publication No. 2018-004770

Incidentally, in an actual usage environment of a laser transmission cable, it is assumed that for example, a residual stress and an external tensile force are applied to the fiber adhered and fixed by the resin, due to a change in the volume of the resin due to the curing shrinkage when the resin is cured.

On the other hand, in laser processing, the beam quality of the laser light has a great influence on the processing quality, so that the laser transmission cable is required to have a function of maintaining the beam quality of the laser light to be transmitted. When the optical fiber is partially adhered and fixed with a resin (fixing resin), the curing shrinkage of the fixing resin may cause bending or stress to be applied to a part of the optical fiber, which may deteriorate the beam quality.

SUMMARY

Therefore, one or more embodiments of the present invention provide an optical fiber fixing structure, a laser transmission cable using the optical fiber fixing structure, and a laser device capable of suppressing deterioration of the beam quality of laser light propagating through an optical fiber.

An optical fiber fixing structure (i.e., an optical fiber fixing tool) according to one or more embodiments of the present invention includes a fiber accommodating part (i.e., a fiber accommodating body) in which a fiber accommodating groove is formed, the fiber accommodating groove that accommodates therein at least a part of a bare fiber exposure portion (i.e., a bare portion of an optical fiber) in which a covering (i.e., a cover) of an optical fiber is removed and a bare fiber is exposed, and a boundary part between the bare fiber exposure portion and a covering portion in which the covering of the optical fiber is provided, and a fixing resin with which an inside of the fiber accommodating groove is filled, and which fixes at least a part of the bare fiber exposure portion and the boundary part, in which in a cross-sectional view of the fiber accommodating groove viewed from a cross section perpendicular to a longitudinal direction of the optical fiber, the entire bare fiber exposure portion and the entire boundary part are accommodated in the fiber accommodating groove, and the fixing resin covers an entire outer circumference of the bare fiber exposure portion and an entire outer circumference of the boundary part.

With such a configuration, the residual stress and tensile force generated when the fixing resin, between the bare fiber exposure portion and the wall of the fiber accommodating groove and between the boundary part and the wall of the fiber accommodating groove, is cured and shrunk are uniformly distributed over the entire circumference of the optical fiber. As a result, when the optical fiber is fixed in the fiber accommodating groove, it is possible to suppress bending and non-uniform stress applied to the optical fiber, and it is possible to suppress deterioration of the beam quality of the laser light propagating through the optical fiber.

Further, in the cross-sectional view, the bare fiber exposure portion and the boundary part may be away from (i.e., disposed apart from) the bottom surface and the side surface of the fiber accommodating groove.

With such a configuration, it is possible to more uniformly distribute the residual stress and tensile force generated when the resin between the bare fiber exposure portion and the wall of the fiber accommodating groove is cured and shrunk, and it is possible to suppress deterioration of the beam quality.

In a cross-sectional view, an inside of the fiber accommodating groove may be filled with the fixing resin, and the fixing resin may project to an outside of the fiber accommodating groove.

Further, the fiber accommodating groove may accommodate therein a part of the covering portion of the optical fiber, and the fixing resin may cover an entire outer circumference of the covering portion accommodated in the fiber accommodating groove in the cross-sectional view.

With such a configuration, the optical fiber can be more stably fixed to the fiber accommodating part while suppressing deterioration of the beam quality of the laser light propagating through the optical fiber.

Further, the laser transmission cable according to one or more embodiments of the present invention includes the above-described optical fiber fixing structure, and an end cap connected to an end part of the bare fiber and having a cross-sectional area larger than a cross-sectional area of the bare fiber.

The optical fiber fixing structure described above makes it possible to suppress deterioration of the beam quality of the laser light propagating through the optical fiber. Therefore, in the laser transmission cable provided with any of the above optical fiber fixing structures, the residual stress and tensile force generated when the fixing resin between the bare fiber exposure portion and the wall of the fiber accommodating groove is cured and shrunk is uniformly distributed over the entire circumference of the optical fiber, so that deterioration of the beam quality of the laser light propagating through the optical fiber can be suppressed.

Further, the laser device according to one or more embodiments of the present invention includes the laser transmission cable and at least one light source that emits light propagating through the laser transmission cable.

The optical fiber fixing structure described above makes it possible to suppress deterioration of the beam quality of the laser light propagating through the optical fiber. Therefore, in the laser device provided with the laser transmission cable, the residual stress and tensile force generated when the fixing resin between the bare fiber exposure portion and the wall of the fiber accommodating groove is cured and shrunk is uniformly distributed over the entire circumference of the optical fiber, so that it is possible to output laser light in which deterioration of beam quality is suppressed.

As described above, according to the optical fiber fixing structure according to one or more embodiments of the present invention, deterioration of the beam quality of the laser light propagating through the optical fiber can be suppressed. Further, according to the laser transmission cable according to one or more embodiments of the present invention, it is possible to suppress deterioration of the beam quality of the laser light propagating through the optical fiber by suppressing the bending of the optical fiber in the optical fiber fixing structure. Further, in the laser device according to one or more embodiments of the present invention, by suppressing the bending of the optical fiber in the optical fiber fixing structure, it is possible to output the laser light in which the deterioration of the beam quality is suppressed.

DETAILED DESCRIPTION

Hereinafter, embodiments of the optical fiber fixing structure, the laser transmission cable using the optical fiber fixing structure, and the laser device according to the present invention will be described in detail with reference to the drawings.

First Embodiment

First, the configuration of a laser device of the present embodiment will be described.

Figure 1:
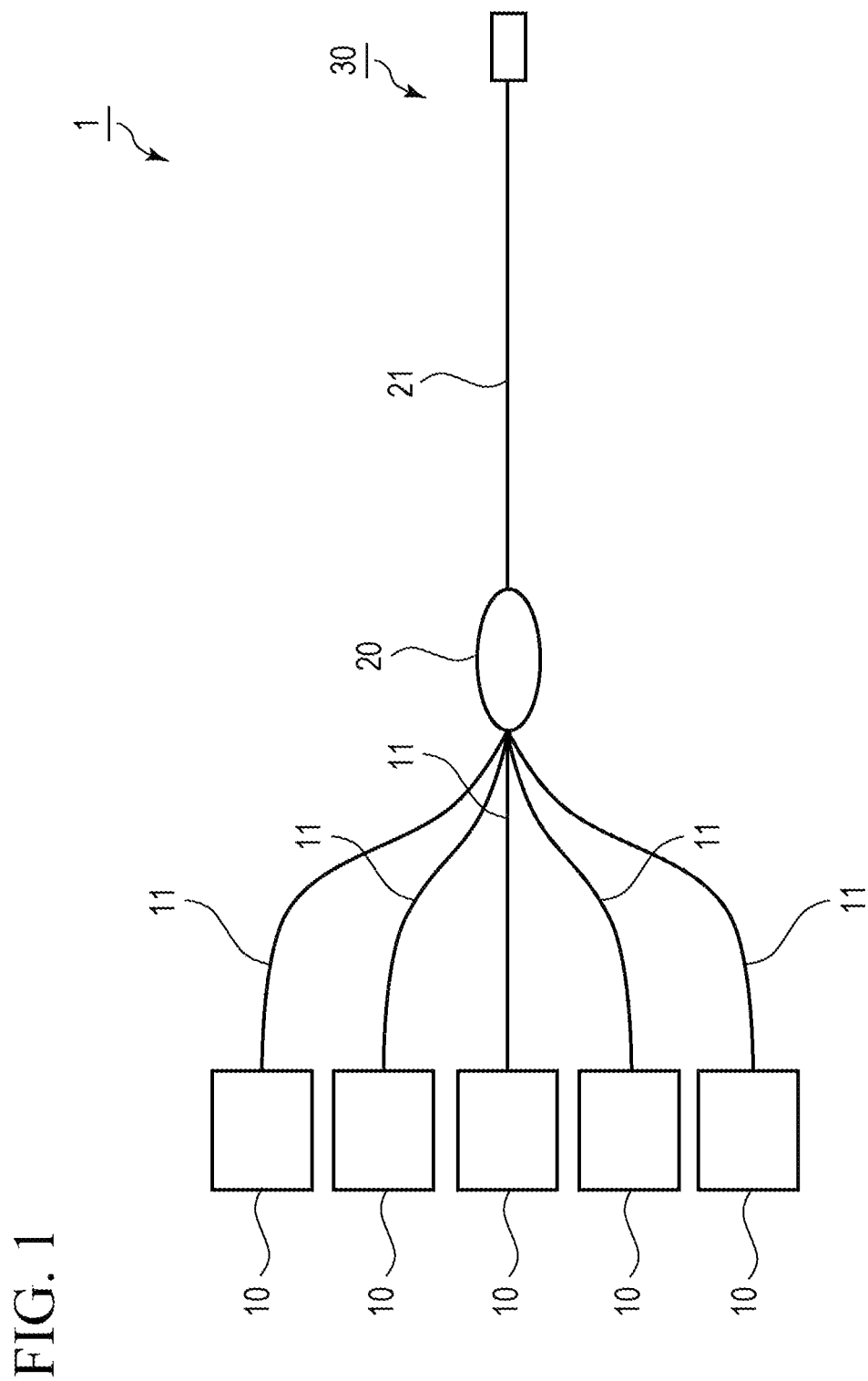
FIG. 1 is a conceptual diagram showing a laser device according to a first embodiment of the present invention.

FIG. 1 is a conceptual diagram showing a laser device according to the present embodiment. As shown in FIG. 1, the laser device 1 of the present embodiment includes a plurality of light sources 10, an optical combiner 20, and a laser transmission cable 30 as main components.

Each light source 10 is a laser device that emits signal light having a predetermined wavelength, and is, for example, a fiber laser device or a solid-state laser device. When the light source 10 is a fiber laser device, for example, a resonator type fiber laser device or a Master Oscillator Power Amplifier (MO-PA) type fiber laser device is used. The signal light emitted from each light source 10 is, for example, light having a wavelength of 1070 nm. The signal light is not limited to the light including the signal.

An optical fiber 11 through which signal light emitted from the light source 10 propagates is connected to each light source 10. The optical fiber 11 includes a bare fiber and a covering layer (i.e., a cover) formed on the outer circumference of the bare fiber. The bare fiber is formed of, for example, silica-based glass, and transmits light. The bare fiber has a core and a cladding covering the core. The covering layer is formed of, for example, a UV curable resin, and covers the bare fiber. The covering layer may be formed of one resin layer, or may include two layers of a primary layer and a secondary layer. Alternatively, it may have two or more resin layers.

Each optical fiber 11 is, for example, a few mode fiber having a core diameter of about 20 μm. Therefore, the signal light emitted from each of the light sources 10 propagates through each of the optical fibers 11 in the Linearly Polarized (LP) mode of about 2 to 10.

The optical combiner 20 is a member that optically connects the cores of a plurality of optical fibers 11 and the core of the optical fiber 21. In the optical combiner 20, for example, each optical fiber 11 and an optical fiber 21 having a diameter larger than that of the optical fiber 11 are connected at the end faces.

The optical fiber 21 includes a bare fiber and a covering layer formed on the outer circumference of the bare fiber. The bare fiber is formed of, for example, silica-based glass, and transmits light. The bare fiber has a core and a cladding covering the core. The covering layer of the optical fiber 21 may have the same configuration as that of the optical fiber 11.

The optical fiber 21 may be a multimode fiber having a core diameter of about 50 μm to 100 μm and a cladding outer diameter of about 360 μm, for example.

Figure 2A:
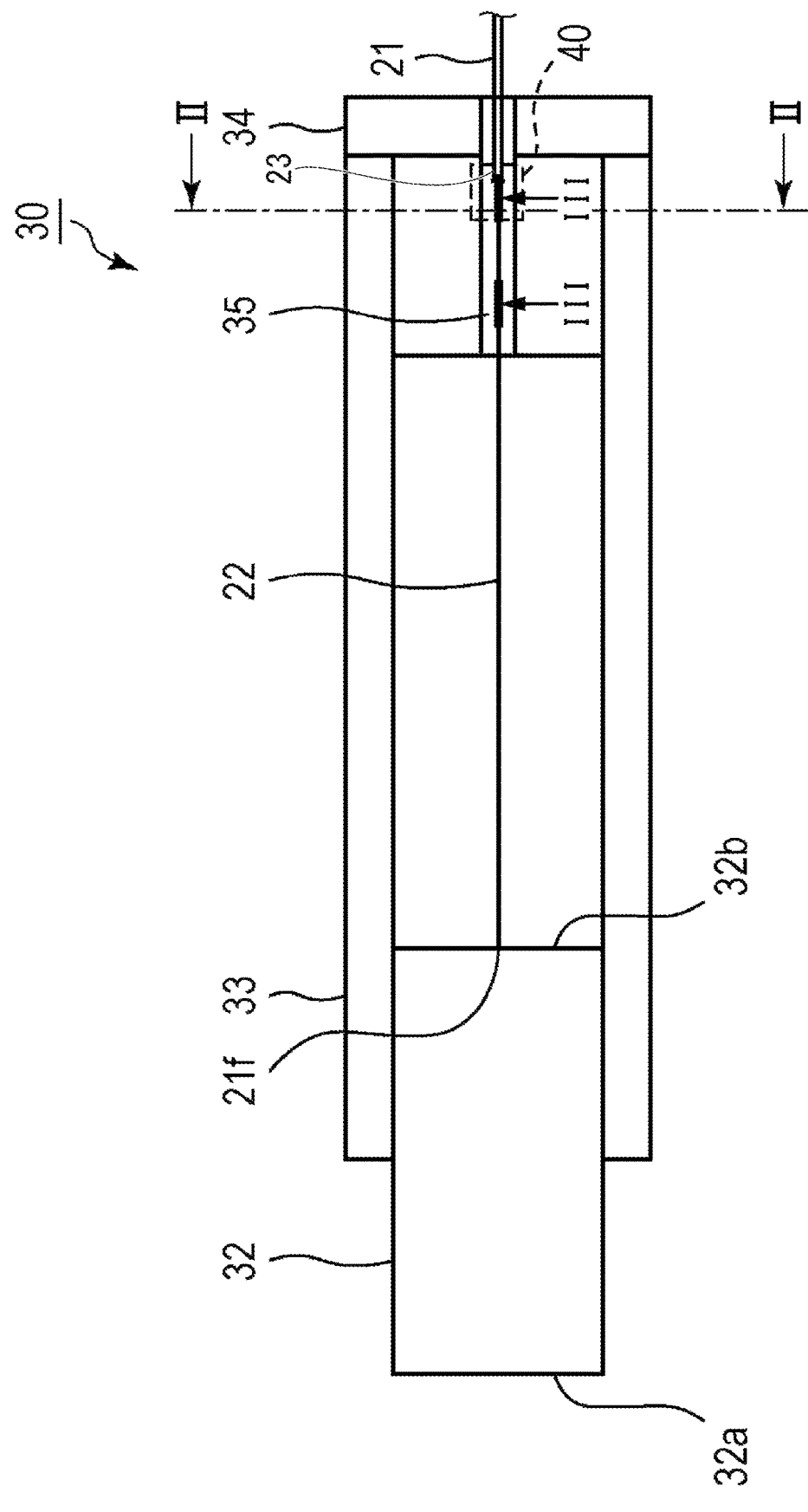
FIG. 2A is an enlarged view illustrating a part of the optical fiber fixing structure illustrated in FIG. 1.

FIG. 2A is an enlarged cross-sectional view of a part of the laser transmission cable 30 shown in FIG. 1. The laser transmission cable 30 illustrated in FIG. 2A includes a part of the covering portion 23 of an optical fiber 21, a bare fiber exposure portion 22, an end cap 32, a housing 33, a fiber accommodating part 34, and an optical fiber fixing structure 40 as main components.

(Direction Definition)

In the laser transmission cable 30 of the present embodiment, the direction in which the optical fiber 21 extends is referred to as the longitudinal direction. Further, viewing in a cross section along the longitudinal direction is called a cross-sectional view.

In the optical fiber 21 included in the laser transmission cable 30, the covering layer is peeled off and the bare fiber is exposed at the end part of the optical fiber 21 on the exit end side opposite to the light source 10 side. In the longitudinal direction of the optical fiber 21, the bare fiber exposure portion 22 without a covering layer and a covering portion 23 provided with a covering layer are provided in this order from the exit end side. Further, the end surface 21*f* on the exit end side of the optical fiber 21 is fused to the central part of one end surface (incident surface 32*b*) of the end cap 32 by, for example, an oxyhydrogen burner. As a result, the optical fiber 21 is optically coupled to the end cap 32.

The end cap 32 is a columnar body (light transmitting columnar member) that transmits signal light propagating through the optical fiber 21. The end cap 32 of the present embodiment is a silica columnar body. The end cap 32 is, for example, a cylindrical body of silica having a diameter of about 8 mm and a length of about 20 mm. The end cap 32 has an incident surface 32*b* and an exit surface 32*a*. The incident surface 32*b* is optically coupled to the end surface 21*f* of the optical fiber 21 as described above. On the exit surface 32*a*, the light incident from the optical fiber 21 is launched. The incident surface 32*b* of the end cap 32 is larger than the outer diameter of the core of the optical fiber 21.

The incident surface 32*b* of the end cap 32 of the present embodiment is larger than the end surface 21*f* of the optical fiber 21.

The housing 33 is a member that accommodates a part of the end cap 32 and the exit end of the optical fiber 21. The bare fiber exposure portion 22 in which the covering layer of the optical fiber 21 has been removed and a part of the covering portion 23 provided with the covering layer are accommodated in the housing 33. The housing 33 is formed in a tubular shape extending in the longitudinal direction, and the inner diameter is larger than the outer diameter of the end cap 32. A part of the end cap 32 and a part of the optical fiber 21 are inserted into the housing 33. In the housing 33, the position of the end cap 32 is fixed by fixing the outer peripheral surface of the end cap 32 to the inner peripheral surface of the housing 33 with an adhesive such as a silicone resin.

The housing 33 may be made of, for example, a metal such as copper having excellent thermal conductivity. Further, the outer peripheral surface of the housing 33 may be water-cooled or air-cooled according to the power of light emitted from the laser device 1.

Figure 3:
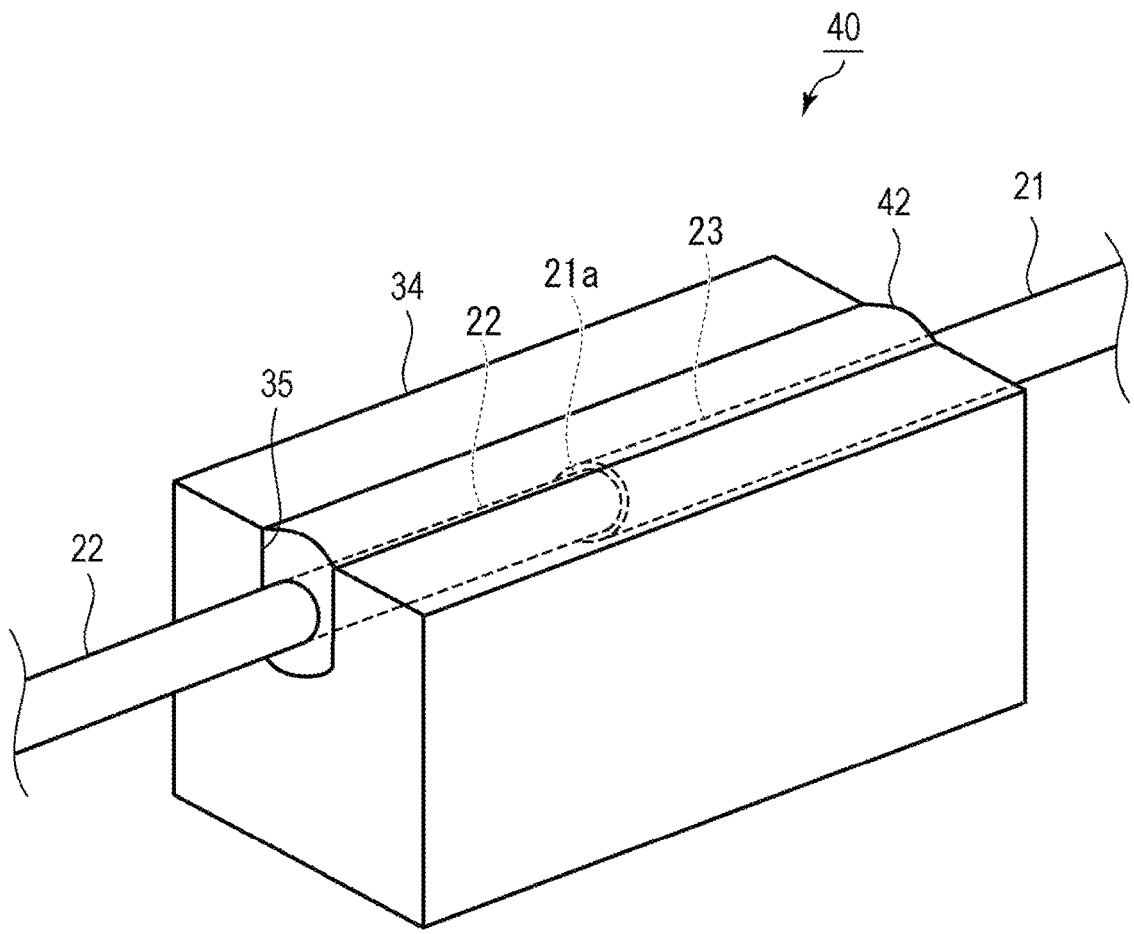
FIG. 3 is an enlarged perspective view illustrating a part of the optical fiber fixing structure illustrated in FIG. 1.

Next, the optical fiber fixing structure 40 will be described. FIG. 3 is a perspective view of the optical fiber fixing structure 40. The optical fiber fixing structure 40 of the present embodiment includes a fiber accommodating part 34 and a fixing resin 42. The fiber accommodating part 34 is formed with a fiber accommodating groove 35 for accommodating the optical fiber 21. The fiber accommodating groove 35 accommodates, for example, a part of the bare fiber exposure portion 22, a part of the covering portion 23, and a boundary part 21*a* between the bare fiber exposure portion 22 and the covering portion 23. Not limited to this example, at least, a part of the bare fiber exposure portion 22 and the boundary part 21*a* may be accommodated in the fiber accommodating groove 35.

The fiber accommodating groove 35 is filled with a fixing resin 42 for fixing the optical fiber 21.

The fixing resin 42 is, for example, a thermosetting adhesive, a thermoplastic adhesive, a two-component adhesive, or the like. The liquid fixing resin 42 fills the gap between the inner peripheral surface of the fiber accommodating groove 35 and the outer peripheral surface of the optical fiber 21, and then is cured. Thus, the exit end side of the optical fiber 21 is fixed in the fiber accommodating groove 35 by the fixing resin 42.

In the optical fiber fixing structure 40 illustrated in FIG. 3, in the longitudinal direction, the fixing resin 42 covers a region including a part of the bare fiber exposure portion 22, a part of the covering portion 23, and the boundary part 21*a*. The fixing resin 42 covers the entire outer circumference of the optical fiber 21 in the region.

Not limited to this example, at least, a part of the bare fiber exposure portion 22 and the boundary part 21*a* may be covered with the fixing resin 42 over the entire circumference of the region.

Figure 2B:
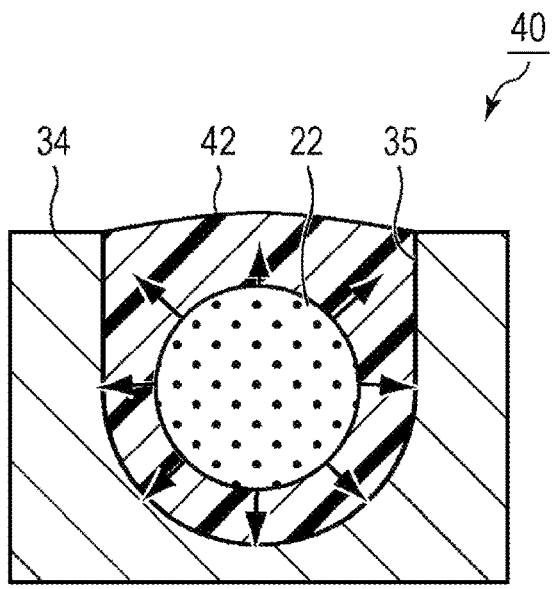
FIG. 2B is a cross-sectional view of the optical fiber fixing structure taken along line II-II of FIG. 2A.

FIG. 2B is a cross-sectional view of the optical fiber fixing structure 40 at a position along the line II-II of FIG. 2A. The line II-II is a line perpendicular to the longitudinal direction of the bare fiber exposure portion 22 accommodated in the fiber accommodating groove 35.

As illustrated in FIG. 2B, in the optical fiber fixing structure 40 of the present embodiment, the depth of the fiber accommodating groove 35 formed in the fiber accommodating part 34 is larger than the diameter of the bare fiber of the optical fiber 21.

As illustrated in FIG. 2B, in a cross-sectional view of the fiber accommodating groove 35 accommodating the bare fiber exposure portion 22, the entire bare fiber exposure portion 22 is accommodated in the fiber accommodating groove 35, and the fixing resin 42 covers the entire outer circumference of the bare fiber exposure portion 22.

The shape of the bottom surface of the fiber accommodating groove 35 is not limited to a semicircle. For example, the shape of the bottom surface may be square.

In a cross-sectional view, the inside of the fiber accommodating groove 35 may be filled with the fixing resin 42. Further, the fixing resin 42 may protrude to the outside of the fiber accommodating groove 35.

Figure 2C:
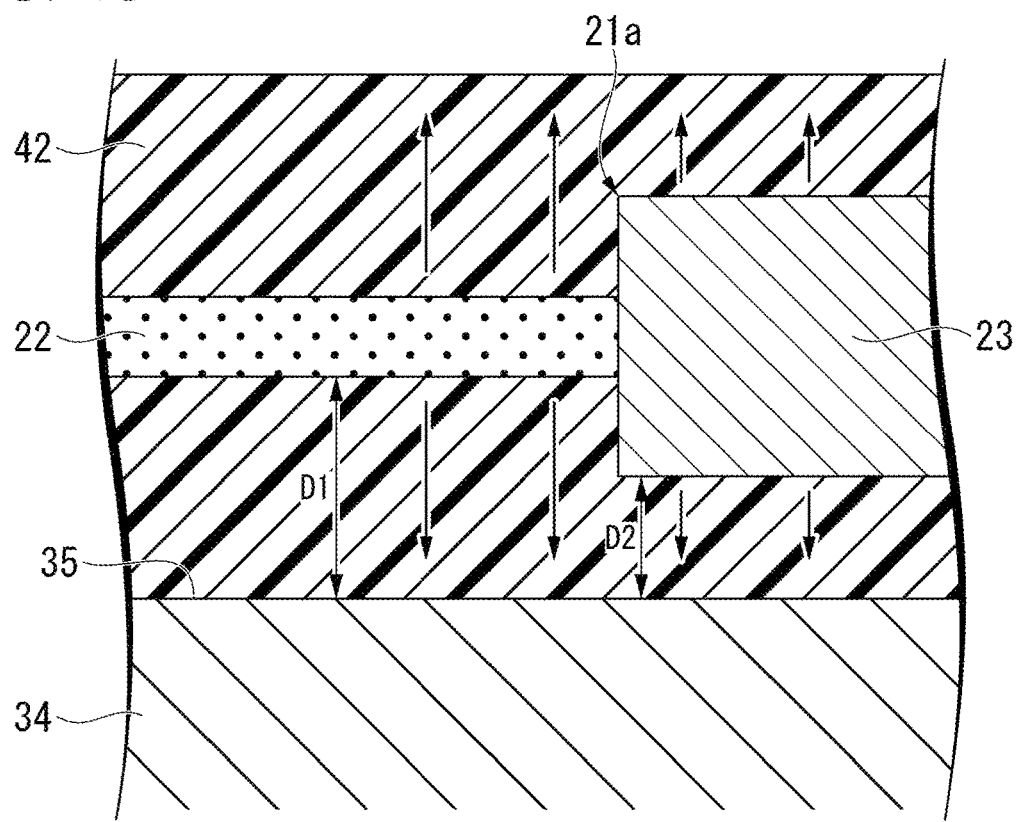
FIG. 2C is a cross-sectional view taken along the line III-III of FIG. 2A.

Further, as illustrated in FIG. 2C, the optical fiber 21 is not in contact with the groove bottom of the fiber accommodating groove 35. Therefore, the entire circumferences of the bare fiber exposure portion 22, the boundary part 21*a*, and the covering portion 23 are covered with the fixing resin 42.

<Fixing of Optical Fiber 21 with Fixing Resin 42>

As described above, the optical fiber 21 is fixed in the fiber accommodating groove 35 by the fixing resin 42. The fixing resin 42 is a curable resin in which a liquid resin is cured in response to, for example, heat, humidity, ultraviolet rays, or the like. Generally, the volume of such a resin shrinks due to a curing reaction. Therefore, stress may remain in the cured resin.

In the present embodiment, when the fixing resin 42 between the optical fiber 21 and the wall surface of the fiber accommodating groove 35 is cured and shrunk, it is considered that the volume of the fixing resin 42 changes in the direction perpendicular to the longitudinal direction, and the residual stress occurs on the outer peripheral part of the optical fiber 21.

That is, the bare fiber exposure portion 22, the boundary part 21*a*, and the covering portion 23 receive a force (tensile force) that is pulled toward the side wall and the bottom wall of the fiber accommodating groove 35 in the direction of the arrow illustrated in FIGS. 2B and 2C.

This tensile force increases as the area to which the fixing resin 42 is applied in the longitudinal direction becomes longer. When the range becomes excessively long, the optical fiber 21 may be fixed in a bent state.

Here, as illustrated in FIG. 2C, in the optical fiber 21, the outer diameter of the bare fiber exposure portion 22 is smaller than the outer diameter of the covering portion 23, so that the distance D1 between the bare fiber exposure portion 22 and the fiber accommodating groove 35 is larger than the distance D2 between the boundary part 21a and the covering portion 23 and the fiber accommodating groove 35.

Therefore, the volume change amount of the fixing resin 42 around the bare fiber exposure portion 22 is larger than the volume change amount of the fixing resin 42 around the boundary part 21a and the covering portion 23. That is, the tensile force received by the bare fiber exposure portion 22 that is pulled toward the side wall and the bottom wall of the fiber accommodating groove 35 is larger than the tensile force received by the boundary part 21a and the covering portion 23.

When the total tensile force received by the bare fiber exposure portion 22 in the longitudinal direction becomes larger than the rigidity of the bare fiber of the optical fiber 21, the bare fiber exposure portion 22 may bend starting from the boundary part 21a.

In the present embodiment, an optical fiber fixing structure 40 includes a fiber accommodating part 34 in which a fiber accommodating groove 35 is formed, the fiber accommodating groove 35 that accommodates therein at least a part of a bare fiber exposure portion 22 in which a covering of an optical fiber 21 is removed and a bare fiber is exposed, and a boundary part 21a between the bare fiber exposure portion 22 and a covering portion 23 in which the covering of the optical fiber is provided, and a fixing resin 42 with which an inside of the fiber accommodating groove 35 is filled, and which fixes at least a part of the bare fiber exposure portion 22 and the boundary part 21a, in which in a cross-sectional view, the entire bare fiber exposure portion 22 and the entire boundary part 21a are accommodated in the fiber accommodating groove 35, and the fixing resin 42 covers the entire outer circumference of the bare fiber exposure portion 22 and the entire outer circumference of the boundary part 21a.

With such a configuration, the residual stress and tensile force generated when the fixing resin 42, between the bare fiber exposure portion 22 and the wall of the fiber accommodating groove 35 and between and the boundary part 21a and the wall of the fiber accommodating groove 35, is cured and shrunk, are uniformly distributed over the entire circumference of the optical fiber 21. As a result, when the optical fiber 21 is fixed in the fiber accommodating groove 35, it is possible to suppress bending and non-uniform stress applied to the optical fiber 21, and it is possible to suppress deterioration of the beam quality.

Further, in the related art, the fixing resin 42 for fixing the optical fiber 21 to the fiber accommodating part 34 has been required to have an adhesive force that can withstand the expected residual stress and tensile force without peeling. It has been known that in order to increase the adhesive force of the fixing resin 42, it is effective to increase the contact area between the optical fiber 21 and the fixing resin 42 and the contact area between the fiber accommodating part 34 and the fixing resin 42. Therefore, it is conceivable to increase the length of the region to which the fixing resin 42 is applied in the longitudinal direction of the optical fiber.

Here, for example, when the fixing resin 42 is applied on the covering portion 23 of the optical fiber 21, deterioration of the beam quality may be avoided. However, the adhesive force may be insufficient only by the contact area between the fixing resin 42 and the covering portion 23. In addition, by informing the end user that the user needs to be careful not to peel off the adhesive between the fixing resin 42 and each component, the usage environment may be limited such that an external force in addition to the stress and tensile force remaining in the fixing resin 42 is not applied to the fixing part of the optical fiber 21. However, as a result, the workability of the end user may be reduced.

On the other hand, in the present embodiment, the bare fiber exposure portion 22 and the boundary part 21a are fixed to the fiber accommodating part 34 by the fixing resin 42. With such a configuration, a wider contact area between the optical fiber 21 and the fixing resin 42 can be secured as compared with the case where the fixing resin 42 is applied only to the covering portion 23 of the optical fiber 21 and fixed to the fiber accommodating part 34. Therefore, it is possible to stably fix the optical fiber 21 to the fiber accommodating groove 35.

Further, in the cross-sectional view, the bare fiber exposure portion 22 and the boundary part 21a may be away from the bottom surface and the side surface of the fiber accommodating groove 35.

This makes it possible to more uniformly distribute the residual stress and tensile force generated when the fixing resin 42 between the bare fiber exposure portion 22 and the wall of the fiber accommodating groove 35 is cured and shrunk, and it is possible to suppress deterioration of the beam quality.

The inside of the fiber accommodating groove 35 may be filled with the fixing resin 42 in a cross-sectional view, and the fixing resin 42 may project to the outside of the fiber accommodating groove 35.

Thus, in the cross-sectional view, it is possible to eliminate the part where the thickness of the fixing resin 42 disposed on the outer circumference of the bare fiber exposure portion 22 is excessively thin, so that it is possible to further suppress the application of non-uniform stress to the optical fiber 21 and bending.

Further, the fiber accommodating groove 35 may accommodate a part of the covering portion 23 of the optical fiber 21 inside, and the fixing resin 42 may cover the entire outer circumference of the covering portion 23 accommodated in the fiber accommodating groove 35 in the cross-sectional view.

Thus, the contact area between the optical fiber 21 and the fixing resin 42 can be secured wider, so that it is possible to stably fix the optical fiber 21.

The laser transmission cable 30 according to the present embodiment includes the above-described optical fiber fixing structure 40, and an end cap 32 connected to an end part of the bare fiber and having a cross-sectional area larger than the cross-sectional area of the bare fiber.

According to the present embodiment, the optical fiber fixing structure 40 makes it possible to suppress deterioration of the beam quality of the laser light propagating through the optical fiber 21.

The laser device 1 according to the present embodiment includes the above-described laser transmission cable 30, and at least one light source 10 that emits light propagating through the laser transmission cable 30.

According to the present embodiment, the optical fiber fixing structure 40 makes it possible to suppress deterioration of the beam quality of the laser light propagating through the optical fiber 21.

Example

The following experiments are conducted to check the effectiveness of the present embodiment. The present invention is not limited to the examples below.

Figure 4A:
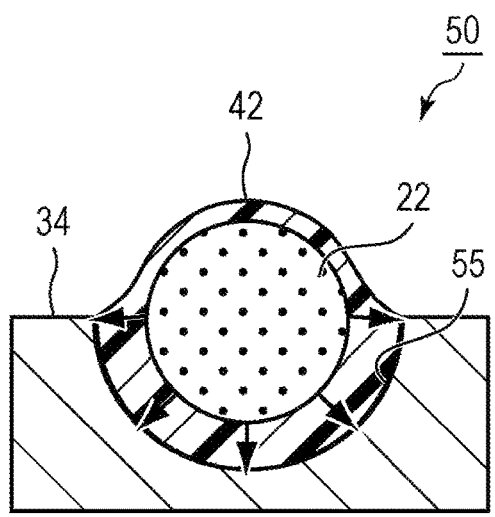
FIG. 4A is a cross-sectional view of the optical fiber fixing structure in a comparative example when viewed in a cross section perpendicular to the longitudinal direction of the optical fiber.
Figure 4B:
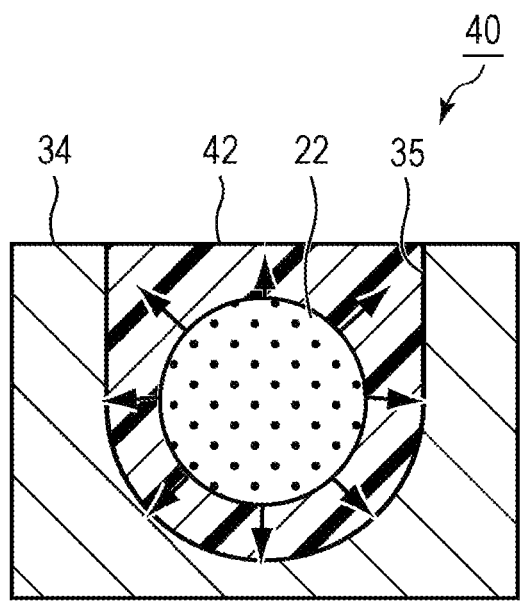
FIG. 4B is a cross-sectional view of the optical fiber fixing structure in an example when viewed in a cross section perpendicular to the longitudinal direction of the optical fiber.

A light source in which the Beam Parameter Products (BPP) of the output light is measured in advance is prepared, the light from the light source is incident on the optical fiber of the optical fiber fixing structure 40 illustrated in FIG. 4B, and the BPP of the light output from the optical fiber fixing structure 40 is measured. In the optical fiber fixing structure 40 illustrated in FIG. 4B, the inside of the fiber accommodating groove 35 is filled with the fixing resin 42, but the fixing resin 42 does not project to the outside of the fiber accommodating groove 35.

ΔBPP is calculated as the difference between the BPP of the light output from the optical fiber fixing structure 40 and the BPP of the light output from the light source, that is, the amount of deterioration of the beam quality in the optical fiber fixing structure 40. A total of five experimental samples are prepared. The optical fiber used in the experimental sample has a covering diameter of φ500 μm, a cladding diameter of φ200 μm, and a core diameter of φ100 μm, the depth of the fiber accommodating groove 35 is 1.0 mm, and the covering length of the fixing resin 42 in the longitudinal direction of the optical fiber is 4 mm. The experimental results are shown in Table 1 below.

Comparative Example

Further, as a comparative example, the same experiment has been performed on the optical fiber fixing structure 50 as illustrated in FIG. 4A. That is, the light from the light source is input, and the BPP of the light output from the optical fiber fixing structure 50 of the comparative example is measured. ΔBPP is calculated as the difference between the BPP of the light output from the optical fiber fixing structure 50 of the comparative example and the BPP of the light output from the light source, that is, the amount of deterioration of the beam quality in the optical fiber fixing structure 50. A total of five experimental samples are prepared. The optical fiber used in the experimental sample has a covering diameter of φ500 μm, a cladding diameter of φ200 μm, and a core diameter of φ100 μm, the depth of the fiber accommodating groove 55 is 0.3 mm, and the covering length of the fixing resin 42 in the longitudinal direction of the optical fiber is 4 mm. The experimental results are shown in Table 1 below.

TABLE 1

| Example | | Comparative Example | |
| --- | --- | --- | --- |
| Sample No. | ΔBPP | Sample No. | ΔBPP |
| 1 | 0.02 | 1 | 0.31 |
| 2 | 0.00 | 2 | 0.36 |
| 3 | 0.01 | 3 | 0.40 |
| 4 | 0.01 | 4 | 0.35 |
| 5 | 0.01 | 5 | 0.38 |

From the results in Table 1, it has been found that the ΔBPP of the example is small, and the BPP of the laser light propagating through the optical fiber fixing structure 40 of the example is hardly deteriorated. In the optical fiber fixing structure of the example, the entire length of the optical fiber disposed in the fiber accommodating groove is fixed in the fiber accommodating groove 35 by the fixing resin 42, and it is possible to uniformly distribute the tensile force, in the direction intersecting the longitudinal direction, generated when the fixing resin 42 between the bare fiber exposure portion 22 and the wall of the fiber accommodating groove 35 is cured and shrunk.

Therefore, it is considered that the bending of the fiber at the time of adhesive fixing can be suppressed, and it is possible to suppress the deterioration of the beam quality of the laser light propagating through the optical fiber 21.

On the other hand, it has been found that the ΔBPP of the comparative example is large, and the BPP of the laser light propagating through the optical fiber 21 in the optical fiber fixing structure 50 of the comparative example is significantly deteriorated. The optical fiber fixing structure 50 of the comparative example is fixed in the fiber accommodating groove 55 by the fixing resin 42 in a state where the optical fiber 21 protrudes from the fiber accommodating groove 55 in a cross-sectional view, and receives a large tensile force on the lower side adjacent to the fiber accommodating groove 35, in the circumferential direction of the optical fiber 21. Therefore, it is considered that the tensile force to the optical fiber 21 due to the curing shrinkage of the fixing resin 42 is applied non-uniformly, and the BPP of the laser light is significantly deteriorated.

It should be noted that the technical scope of the present invention is not limited to the above-described embodiments or examples, and various modifications can be made without departing from the spirit of the present invention.

For example, in the longitudinal direction, the fiber accommodating groove 35 may not be filled with the fixing resin 42 over the entire length. At least a part of the bare fiber exposure portion 22 and the boundary part 21a may be covered with the fixing resin 42 over the entire circumference.

As described above, it is checked that the optical fiber fixing structure of the present invention can suppress deterioration of the beam quality propagating through the optical fiber as compared with the optical fiber fixing structure of the comparative example.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Laser device
10: Light source
20: Optical combiner
30: Laser transmission cable
21: Optical fiber
21a: Boundary part
22: Bare fiber exposure portion
23: Covering portion
32: End cap (light transmitting columnar member)
33: Housing
34: Fiber accommodating part
35: Fiber accommodating groove
40: Optical fiber fixing structure
42: Fixing resin

What is claimed is:
1. A laser transmission cable comprising:
a fiber accommodating body having a fiber accommodating groove that accommodates:

at least a part of an uncovered bare portion of an optical fiber, and a boundary part between the uncovered bare portion and a covered portion of the optical fiber, wherein in the uncovered bare portion, a cover of the optical fiber is removed to expose a bare fiber;

a fixing resin that fills an inside of the fiber accommodating groove, and fixes at least the part of the uncovered bare portion and the boundary part; and an end cap that is connected to an end part of the bare fiber and has a cross-sectional area larger than a cross-sectional area of the bare fiber, wherein in a cross-sectional view of the fiber accommodating groove viewed from a cross section of the optical fiber, the entire uncovered bare portion and the entire boundary part are accommodated in the fiber accommodating groove, and the fixing resin covers an entire outer circumference of the uncovered bare portion and an entire outer circumference of the boundary part, the fiber accommodating groove extends along a longitudinal direction of the optical fiber, an end portion of the uncovered bare portion extends out from the fiber accommodating groove, and the end cap includes:
an incident surface that is optically coupled to an end surface of the optical fiber, and
an exit surface where light incident from the optical fiber is launched.

2. The laser transmission cable according to claim 1, wherein
in the cross-sectional view, the uncovered bare portion and the boundary part are disposed apart from a bottom surface and a side surface of the fiber accommodating groove.

3. The laser transmission cable according to claim 1, wherein
in the cross-sectional view, the fixing resin filling the inside of the fiber accommodating groove projects to an outside of the fiber accommodating groove.

4. The laser transmission cable according to claim 1, wherein
the fiber accommodating groove accommodates a part of the covered portion, and in the cross-sectional view, the fixing resin covers an entire outer circumference of the covered portion accommodated in the fiber accommodating groove.

5. A laser device comprising:
the laser transmission cable according to claim 1; and
a light source that emits light propagating through the laser transmission cable.

6. The laser transmission cable according to claim 1, wherein the end portion of the uncovered bare portion extending out from the fiber accommodating groove is not covered by the fixing resin.

7. The laser transmission cable according to claim 1, wherein in the cross-sectional view, a bottom surface of the fiber accommodating groove has a semicircle shape.

8. The laser transmission cable according to claim 1, further comprising:
a housing that accommodates the fiber accommodating groove and a part of the end cap.

9. An optical fiber fixing tool comprising:
a fiber accommodating body having a fiber accommodating groove that accommodates:
at least a part of an uncovered bare portion of an optical fiber, and
a boundary part between the uncovered bare portion and a covered portion of the optical fiber, wherein in the uncovered bare portion, a cover of the optical fiber is removed to expose a bare fiber; and a fixing resin that fills an inside of the fiber accommodating groove, and fixes at least the part of the uncovered bare portion and the boundary part, wherein in a cross-sectional view of the fiber accommodating groove viewed from a cross section of the optical fiber, the entire uncovered bare portion and the entire boundary part are accommodated in the fiber accommodating groove, and the fixing resin covers an entire outer circumference of the uncovered bare portion and an entire outer circumference of the boundary part, the fiber accommodating groove extends along a longitudinal direction of the optical fiber, an end portion of the uncovered bare portion extends out from the fiber accommodating groove, and in the cross-sectional view, the fixing resin filling the inside of the fiber accommodating groove projects to an outside of the fiber accommodating groove.

* * * * *